No. 702,573. Patented June 17, 1902.
F. MARX.
APPARATUS FOR THE MANUFACTURE OF ARTIFICIAL STONE.
(Application filed May 17, 1901.)
(No Model.)
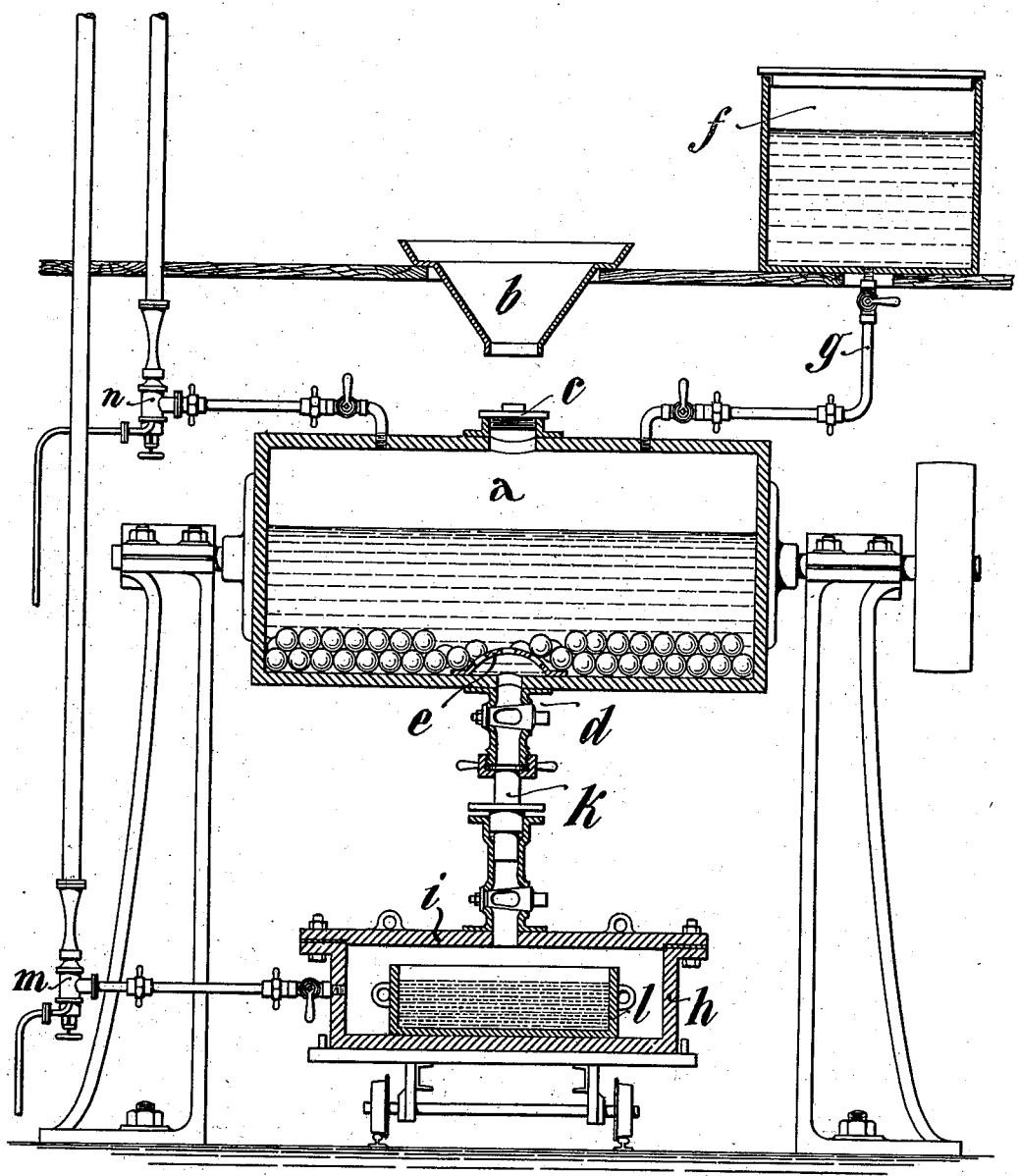
Witnesses:
Inventor:

UNITED STATES PATENT OFFICE.

FRIEDRICH MARX, OF LEIPSIC, GERMANY.

APPARATUS FOR THE MANUFACTURE OF ARTIFICIAL STONE.

SPECIFICATION forming part of Letters Patent No. 702,573, dated June 17, 1902.

Application filed May 17, 1901. Serial No. 60,788. (No model.)

*To all whom it may concern:*

Be it known that I, FRIEDRICH MARX, manufacturer, a subject of the King of Saxony, and a resident of No. 28 Berlinerstrasse, Leipsic, in the Kingdom of Saxony and Empire of Germany, have invented certain new and useful Improvements in Apparatus for the Manufacture of Artificial Stone, of which the following is a specification.

This invention relates to an apparatus for the manufacture of artificial stone free from pores and unassailable by moisture or atmospheric influences and which does not break or shrink and on account of its dense and uniform consistency is particularly adapted for use for lithographic purposes, as it is at least quite equal and in certain respects superior to natural lithographic stones.

An apparatus for the manufacture of artificial stone of this description is shown in section in the accompanying drawing.

The same consists, essentially, of a mixing device $a$ in the form of a cylinder which can be closed hermetically. Above the cylinder is arranged a funnel $b$, under which is an opening $c$ in the cylinder for the introduction of the material. Upon the opposite side to this opening $c$ is another opening in the cylinder, leading to the union $d$, which can be closed by a stop-cock. Within the cylinder are the mixing-balls for mixing and further grinding of the already-ground material, while above this union is a guard or sieve $e$ to prevent the falling out of the said balls during the discharge of the liquid mass. Above this mixing device is a vessel $f$, which is so connected to the mixing-drum $a$ as to be easily detached and which serves to receive a lye of magnesium chlorid for the purpose of saturating the ground material in the mixing-drum. This lye must be conducted from the vessel $f$ to the mixing-drum $a$ through the said connecting-tube $g$ without air being carried with the liquid.

Beneath the mixing-drum $a$ is a mold-box for the reception of the material, and in conformity with the entire manufacture of the stone, which takes place *in vacuo*, the said material must reach the mold-box *in vacuo*. To effect this, the said mold-box is arranged in a casing $h$, which can be closed hermetically by means of a cover $i$ and which being mounted on rails can easily be moved away in a lateral direction. A telescopic and movable pipe $k$ is attached to the cover $i$ for the purpose of effecting an air-tight connection between the mixing-drum $a$ and the casing $h$, the said pipe $k$ being arranged to slide into the union $d$ and attached at that end. The drum $a$ as well as the casing $h$ are by means of easily-detachable connecting-pipes each in communication with an air-suction device—as, for instance, a steam injector or exhauster, as shown in the drawing, or with an air-pump.

The material employed for the artificial stone consists of about three parts of finely-pulverized calcium carbonate either in the form of marble or, if the consistency and quality of the finished product are not of very great moment, in the form of limestone, with an addition of burnt magnesite in a proportion corresponding to the desired quality and hardness of the stone; further, two parts of finely-pulverized burnt magnesite and two parts of pure magnesium-chlorid lye of 25° to 30° Baumé. This mixture can, however, be varied within certain limits. Commercial chlorid of magnesium cannot be used for this process without further preparation, but itself or its concentrated solution must be submitted to a purifying process. This is accomplished by simply submitting the solution for ten to twelve days to the atmospheric air, whereby the impurities, particularly sodium chlorid, magnesium sulfate, and other salts, crystallize out, while clay and organic substances deposit on the bottom. By this operation all admixtures, amounting to about ten per cent. of the raw material, are separated and the remaining solution of chlorid of magnesium can be considered as chemically pure. With the aid of the material thus purified artificial stones can be produced which offer a perfect resistance against the influence of air and do not undergo in the course of time any change in their form. Moreover, such stones show such a uniform structure that they can easily be polished and used as lithographic stone, in which case they have many advantages over natural lithographic stones. If no great resistance to weather and durability is required, unpurified or only slightly-purified materials can be used.

The manufacturing process is here as follows: The desired quantity of a finely-ground mixture in suitable proportions of calcium carbonate and magnesite is introduced through the funnel b and the opening c into the drum a, whereupon after hermetically closing the drum the connection is made between the latter and the injector, so that on the operation of the latter a vacuum is produced in the drum corresponding to a column of water of about thirteen feet. Hereby the air is drawn out of the pores of the powdered mixture, and consequently on moistening the powder the moisture will force its way into the pores, thereby preventing the formation of empty spaces or fissures in the finished stone. The supply of chlorid of magnesium solution acting as moistening means from the receiver f is effected by connecting the latter with the drum through the connecting-pipe g, whereupon after opening the stop-cocks the solution will be drawn into the drum, and after disconnecting the pipe g an intimate mixture of the contents is effected by revolving the drum. If required, the drum can be exhausted once more to remove any traces of air from the mixture. The connection between the drum and the casing h is then effected by attaching the connecting-pipe k to the union d, the said casing containing the mold l and being hermetically closed by the cover i. Upon effecting a connection by a branch pipe to the injector m a vacuum is also produced in the casing corresponding to a column of water of about twenty-three feet; but in any case it should exceed the vacuum in the drum. The descent of the contents of the drum into the mold-frame l takes place automatically after opening the stop-cocks in the union d and the connecting-pipe k. The very fluid and uniform mass completely deprived of air spreads out in the mold-box l, which after detaching the respective connecting means and opening the cover i can be lifted out and then left until the solidification of the mass takes place. As soon as a fresh mold-box has been placed into the casing and the latter hermetically closed and again connected with the drum a fresh stone can be produced. The solidification of the mass, owing to the action of the chemical combination of the substances employed, takes place under the development of a considerable temperature of say, 212° to 270° Fahrenheit, thereby facilitating the drying of the mass. Lastly, a rising of the mass cannot, however, take place, as no air is shut in.

Having now described and ascertained the nature of my invention and the manner of carrying the same into effect, be it known that what I consider novel, and desire to protect by Letters Patent, is—

In an improved apparatus for the manufacture of artificial stone free of pores, from a mixture of burnt magnesite, calcium carbonate and a lye of magnesium chlorid as moistening means, from which latter the impurities have been removed by submitting to atmospheric air, whereby the said impurities settle down and, in consequence of the extraction of the salts, a consistent and unvariable product is obtained, especially suitable for lithographic stones, the combination of a hermetically-closable drum a, mounted rotatably, containing mixing-balls and provided with moistening means f and g, an opening c in the drum, a funnel b thereabove for the charge of the drum, a hermetically-closable mold-casing h containing a mold-box l and a connecting-piece between the mixing-drum a and the casing h, this connecting-piece being provided with a telescopically-extending pipe k, adapted to slide into the union d of the mixing-drum in such manner that the said drum a and the casing h become hermetically connected, whereby after exhaustion of the air, for instance by means of an injector or the like, no more air can again enter through the connecting-piece k and the production of the stone is effected *in vacuo*, essentially as and for the purpose set forth.

In witness whereof I have hereunto set my signature in presence of two witnesses.

FRIEDRICH MARX.

Witnesses:
 MORITZ HORN,
 FRANZ MÜLLER.